(12) United States Patent
Krzeminski et al.

(10) Patent No.: US 9,077,769 B2
(45) Date of Patent: Jul. 7, 2015

(54) COMMUNICATIONS SYSTEM PROVIDING ENHANCED TRUSTED SERVICE MANAGER (TSM) VERIFICATION FEATURES AND RELATED METHODS

(75) Inventors: Marek Krzeminski, Waterloo (CA); Ravi Singh, Toronto (CA); Marie Anita Brigitte Gagne, Ottawa (CA); Vincenzo Kazimierz Marcovecchio, Ottawa (CA)

(73) Assignee: BlackBerry Limited, Waterloo (CA)

( * ) Notice: Subject to any disclaimer, the term of this patent is extended or adjusted under 35 U.S.C. 154(b) by 484 days.

(21) Appl. No.: 13/339,834

(22) Filed: Dec. 29, 2011

(65) Prior Publication Data

US 2013/0173736 A1    Jul. 4, 2013

(51) Int. Cl.
*H04L 29/06* (2006.01)
*H04L 29/08* (2006.01)
*H04W 4/00* (2009.01)
*H04W 12/10* (2009.01)

(52) U.S. Cl.
CPC .............. *H04L 67/34* (2013.01); *H04L 67/04* (2013.01); *H04W 4/001* (2013.01); *H04W 12/10* (2013.01)

(58) Field of Classification Search
CPC ..... H04W 12/10; H04W 12/02; H04W 12/08; H04L 29/08549; G06F 17/30902
USPC ......... 709/213; 380/270; 726/2, 3, 26–27, 30; 235/379, 380
See application file for complete search history.

(56) References Cited

U.S. PATENT DOCUMENTS

| 8,196,131 | B1 * | 6/2012 | von Behren et al. | 717/168 |
| 8,364,711 | B2 * | 1/2013 | Wilkins et al. | 707/783 |
| 2005/0131835 | A1 | 6/2005 | Howell, Jr. | |
| 2006/0136548 | A1 | 6/2006 | Nishio et al. | |
| 2008/0205655 | A1 * | 8/2008 | Wilkins et al. | 380/279 |
| 2010/0205432 | A1 | 8/2010 | Corda et al. | 713/159 |
| 2010/0291904 | A1 * | 11/2010 | Musfeldt et al. | 455/414.1 |
| 2010/0303230 | A1 * | 12/2010 | Taveau et al. | 380/30 |
| 2010/0306076 | A1 | 12/2010 | Taveau et al. | 705/26 |
| 2010/0306107 | A1 * | 12/2010 | Nahari | 705/44 |
| 2011/0034160 | A1 | 2/2011 | Corda et al. | 455/418 |
| 2011/0087610 | A1 | 4/2011 | Batada et al. | |
| 2012/0095852 | A1 * | 4/2012 | Bauer et al. | 705/16 |
| 2012/0129452 | A1 * | 5/2012 | Koh et al. | 455/41.1 |

(Continued)

FOREIGN PATENT DOCUMENTS

EP          2043016 A1    4/2009

*Primary Examiner* — Kambiz Zand
*Assistant Examiner* — Tongoc Tran
(74) *Attorney, Agent, or Firm* — Steven M. Greenberg, Esq.; Donna Flores, Esq.; CRGO Law (57) ABSTRACT

A trusted service manager (TSM) server may include at least one communications device capable of communicating with at least one application server, a verification database server, and at least one mobile communications device. The TSM server may further include a processor coupled with the at least one communications device and capable of registering the at least one application server with the verification database server, receiving a request from the at least one application server to access the memory of the mobile communications device, cooperating with the verification database server to verify the at least one application server based upon the access request and based upon registering of the at least one application server, and writing application data from the at least one application server to the memory of the at least one mobile communications device based upon verifying the at least one application server.

26 Claims, 4 Drawing Sheets

(56) References Cited

U.S. PATENT DOCUMENTS

| | | | |
|---|---|---|---|
| 2012/0130838 A1* | 5/2012 | Koh et al. | 705/26.1 |
| 2012/0130839 A1* | 5/2012 | Koh et al. | 705/26.1 |
| 2012/0159148 A1* | 6/2012 | Behren et al. | 713/150 |
| 2012/0159163 A1* | 6/2012 | von Behren et al. | 713/168 |
| 2012/0159195 A1* | 6/2012 | von Behren et al. | 713/193 |
| 2012/0171992 A1* | 7/2012 | Cheong et al. | 455/410 |
| 2012/0172089 A1* | 7/2012 | Bae et al. | 455/558 |
| 2012/0303961 A1* | 11/2012 | Kean et al. | 713/171 |

* cited by examiner

COMMUNICATIONS SYSTEM PROVIDING ENHANCED TRUSTED SERVICE MANAGER (TSM) VERIFICATION FEATURES AND RELATED METHODS

TECHNICAL FIELD

This application relates to the field of communications, and more particularly, to electronic devices and related methods that use near-field communication (NFC).

BACKGROUND

Mobile communication systems continue to grow in popularity and have become an integral part of both personal and business communications. Various mobile devices now incorporate Personal Digital Assistant (PDA) features such as calendars, address books, task lists, calculators, memo and writing programs, media players, games, etc. These multi-function devices usually allow electronic mail (email) messages to be sent and received wirelessly, as well as access the Internet via a cellular network and/or a wireless local area network (WLAN), for example.

Some mobile devices incorporate contactless card technology and/or near field communication (NFC) chips. NFC technology is commonly used for contactless short-range communications based on radio frequency identification (RFID) standards, using magnetic field induction to enable communication between electronic devices, including mobile wireless communications devices. These short-range communications include payment and ticketing, electronic keys, identification, device set-up service and similar information sharing. This short-range high frequency wireless communications technology exchanges data between devices over a short distance, such as only a few centimeters.

DETAILED DESCRIPTION

The present description is made with reference to the accompanying drawings, in which example embodiments are shown. However, many different embodiments may be used, and thus the description should not be construed as limited to the embodiments set forth herein. Rather, these embodiments are provided so that this disclosure will be thorough and complete. Like numbers refer to like elements throughout.

Generally speaking, a trusted service manager (TSM) server is provided which may include at least one communications device capable of communicating with at least one mobile communications device. The TSM server may further include a processor coupled with the at least one communications device and capable of registering an application source, and receiving a request from the application source to access the memory of the at least one mobile communications device. The TSM server may be further capable of verifying the at least one application server based upon the access request and based upon registering of the application source, and writing application data from the application source to the memory of the at least one mobile communications device based upon verifying the application source. Accordingly, this approach may advantageously provide a centralized repository for verifying authorized application sources that are permitted access to mobile communications device memories.

More particularly, registering of the application source may be based upon a service identifier associated with the application source. Moreover, the service identifier may comprise a service identification (ID) associated with the application data and an application ID associated with the application source. In addition, the processor may be further capable of suspending the registration of the application source to prevent writing of application data from the application source to the memory.

Writing of the application data to the memory may comprise at least one of installing a new application or updating an existing application, for example. Also by way of example, the application data may comprise financial transaction application data, physical access application data, etc. The processor may register the application source with a verification database server, for example, and may cooperate with the verification database server to verify the application source.

A related communications system may include at least one mobile communications device comprising a memory, and a TSM server, such as the one described briefly above. A related communications method is also provided and may include registering an application source at a trusted service manager (TSM) server, and receiving a request from the application source to access the memory of the mobile communications device. The method may further include verifying the application source based upon the access request and based upon registering of the application source, and writing application data from the application server to the memory of the at least one mobile communications device via the TSM server based upon verifying the application source.

A related non-transitory computer-readable medium is also provided. The computer-readable medium may have computer-executable instructions for causing a TSM server to perform steps comprising registering an application source, receiving a request from the application source to access the memory of the mobile communications device, verifying the application source based upon the access request and based upon registering of the application source, and writing application data from the application source to the memory of the at least one mobile communications device based upon verifying the application source.

Figure 1:
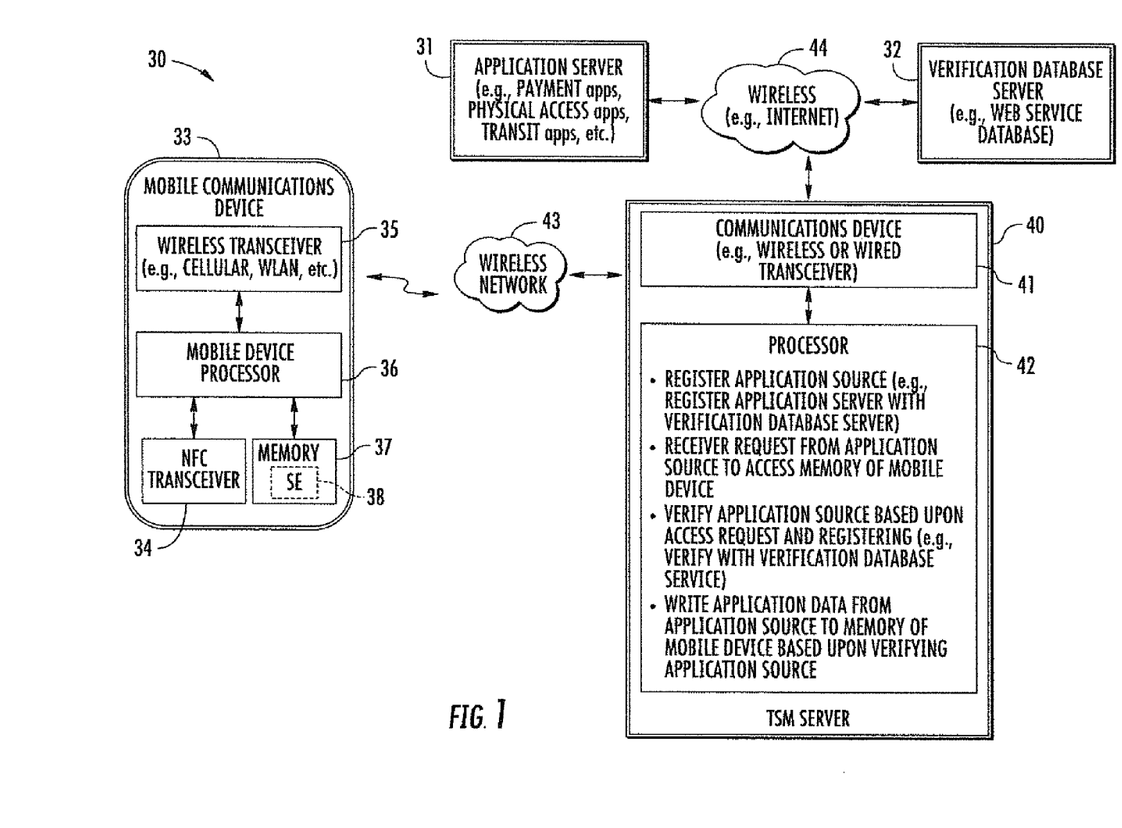
FIG. 1 is a schematic block diagram of a communications system in accordance with one example aspect.
Figure 2:
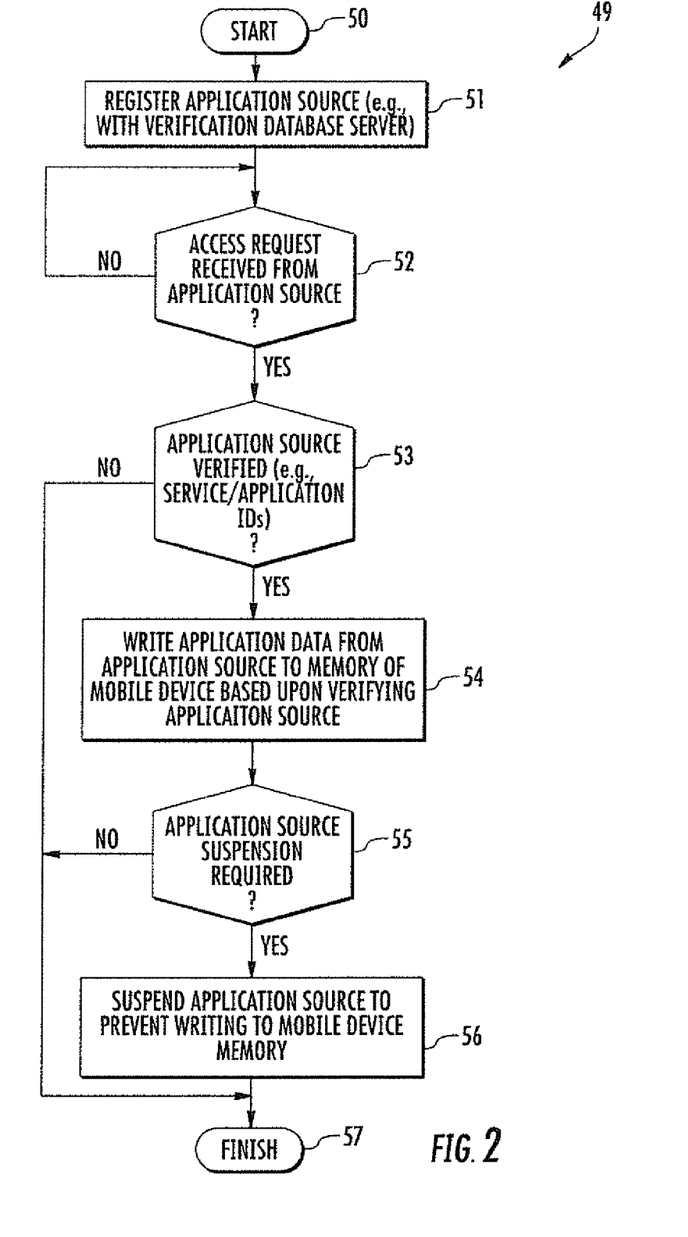
FIG. 2 is a flow diagram illustrating method aspects associated with the system of FIG. 1.
Figure 3:
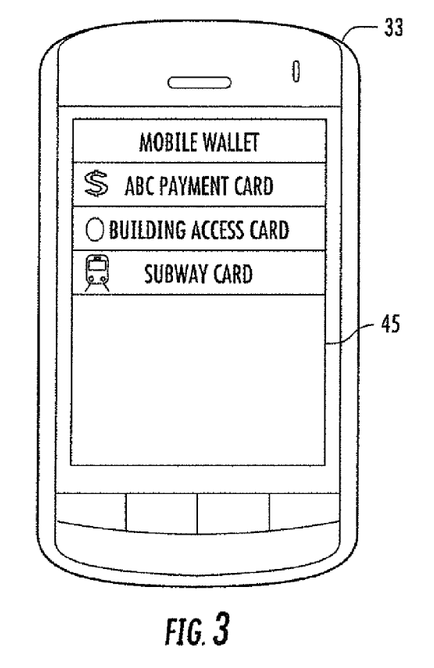
FIG. 3 is a front view of an example mobile device which may be used with the system of FIG. 1 illustrating a mobile wallet configuration.

Referring initially to FIGS. 1 through 3, a communications system 30 and associated method aspects are first described. The system 30 illustratively includes one or more application servers 31, a verification database server 32, and one or more mobile communications devices 33 (also referred to as "mobile devices" herein). The mobile device 33 illustratively includes a near field communication (NFC) transceiver 34, a wireless transceiver 35 (e.g., cellular, wireless LAN, etc.), and a mobile device processor 35 coupled with the NFC transceiver 34 and the wireless transceiver 35. By way of example, the NFC transceiver 34 may be implemented as an NFC chipset which may include other associated components such as an NFC controller, an embedded memory 37 which may be configured as a secure element 38, etc., along with associated computer-executable instructions. However, it should be noted that the memory 37 need not be part of a NFC chipset in all embodiments. For example, the memory 37 may comprise a subscriber identity module (SIM) card, an electronic universal integrated circuit card (eUICC), a removable memory, an SD card, etc., for example, and more than one memory or secure element may be used in different embodiments.

The mobile device processor 36 may be considered as a baseband processor, and it may be implemented using a combination of hardware (e.g., microprocessor, etc.) and a non-transitory computer-readable medium having computer-executable instructions for performing the various operations noted herein. The mobile device processor 36 and the NFC transceiver 34 may communicate via a designated communications channel, such as a JSR-177 communications channel, for example, although other suitable communications formats may also be used. Example types of mobile devices 33 may include portable or personal media players (e.g., music or MP3 players, video players, electronic book readers, etc.), portable gaming devices, portable or mobile telephones, smartphones, portable computers such as tablet computers, digital cameras, etc.

By way of background, NFC is a short-range wireless communications technology in which NFC-enabled devices are "swiped," "bumped" or otherwise moved in close proximity to communicate. In one non-limiting example implementation, NFC may operate at 13.56 MHz and with an effective range of several centimeters (typically up to about 4 cm, or up to about 10 cm, depending upon the given implementation), but other suitable versions of near field communication which may have different operating frequencies, effective ranges, etc., for example, may also be used.

Due to the relatively short effective range, NFC communication is particularly well suited for secure applications such as financial transactions (e.g., credit or debit card payment or purchases), security or physical access applications (e.g., building or parking garage access), transit access (e.g., subway, bus, etc.), for example. Various applications or apps may be installed for causing the NFC-enabled mobile device 33 to securely perform such functions. Generally speaking, applications may be stored in a general device memory, such as plug-in applications for a mobile device wallet, as shown in FIG. 3. Here, the mobile device 33 illustratively includes a display 45, on which a mobile wallet graphical user interface (GUI) is displayed to allow the various application plug-ins to be selected. These applications, in turn, cause the mobile device processor 36 to communicate with the secure element 38 (e.g., via a JSR-177 channel), which securely stores the corresponding app and authentication data to effectuate the given NFC transaction (e.g., payment, building access, etc.).

In the example of FIG. 3, the mobile wallet includes plug-in applications for an ABC payment card, a building access card, and a subway card, although other types or combinations of cards may be present on different mobile devices 33. The secure element data for each application may be provided by respective application servers 31, as will be discussed further below.

Generally speaking, the NFC transceiver 34 may be operable in active or passive modes. Active mode operation may include a peer-to-peer (P2P) mode or a read/write (R/W) mode, for example. During passive operation, the NFC transceiver 34 may function as an NFC tag that is powered by a field from another NFC device (e.g., an NFC reader). The NFC transceiver 34 may also be operable in a power conservation mode, such as a low power tag detection mode, for example.

The system 30 further illustratively includes a trusted service manager (TSM) server 40, which further includes one or more communications devices 41 and a processor 42 coupled with the communications device(s) 41. Similar to the mobile device processor 35 described above, the processor 42 may be implemented with a combination of hardware (e.g., microprocessor, etc.) and a non-transitory computer-readable medium having computer-executable instructions for performing the various operations noted herein. The TSM server 40 advantageously controls access to the secure element 38, so that only application servers 31 associated with authorized service providers are allowed to install or modify secure applications or apps on the secure element 38. As used herein, an "application source" may refer to an authorized service provider, or an application server 31 associated with a given authorized service provider, for example. In one example embodiment, the TSM server 40 may be associated with a mobile device manufacturer to thereby control access to the secure elements 38 on mobile device 33 produced by the manufacturer. Another example implementation is for a network carrier (e.g., a cellular network carrier), which may advantageously control access to secure elements 38 on mobile devices 33 being used on the carrier's network, either for specific types or categories of mobile devices or all mobile devices using the network.

The communications device 41 may comprise a wired or wireless transceiver, for example, which may communicate with the wireless transceiver 35 of the mobile device 33 via a wireless (e.g., cellular, WLAN, etc.) network 43. The communications device 41 may be capable of communicating with an application source (which for the examples described herein will be considered the application server 31) and the verification database server 32 via one or more networks 44, such as the Internet, for example. By way of example, the verification database server 32 may comprise a Web service database, which advantageously provides a central database repository of authorized service providers that are permitted to access the secure element 37 of the mobile device 33, as will be discussed further below. However, it should be noted that in some embodiments the verification database server 32 may be accessible via a local area network, etc., or the TSM server 40 may maintain its own verification database.

Beginning at Block 50 of the flow diagram 49, the application server 31 may be registered with the verification database server 32, at Block 51, which establishes the application server 31 as belonging to a trusted or approved service provider that is permitted to write data for its respective applications (i.e., installing new applications or updating previously installed applications) on the secure element 38 of the mobile device 33. By way of example, the operator of the application sever 31 may communicate a request to the TSM server 40 to register as an approved service provider, such as through a Web interface, for example. The request may include a respective service identifier, which may include a service identification (ID) to identify the application or service to be accessed on the mobile device 33, as well as an application ID which identifies the application server 31, for example. Registration of the application server 31 with the verification database server 32 may be a required prerequisite to requesting access to the secure element 38.

Upon receiving a request from the application server 31 to access the secure element 38, at Block 52, the TSM server 40 cooperates with the verification database server 32 to verify that the request is from an authorized service provider, at Block 53, prior to granting the access request (Block 54). In accordance with one example implementation, when the application server 31 attempts to access the secure element

38, it makes a request including a service identifier indicating a service (e.g., by its service ID) on the secure element 38 to be accessed as well as the respective application ID of the application server 31. The service identifier may be used to make a Web service call to the verification database server 32 to obtain a list of stored service identifiers. Access by the application server 31 to the secure element 38 may be allowed or restricted based upon verification of the service identifier included in the request with respect to the list of stored service identifiers.

If a connection to the verification database 32 cannot be made, or if a connection is made but the application server 31 is not properly verified, then access to the secure element 38 will be denied, which concludes the illustrated method, at Block 57. If access is allowed (meaning the application server 31 is properly verified), then the TSM server 40 may advantageously establish a secure communications channel with the mobile device 33 for performing the requisite data writing operations (e.g., new application installation, modification, updating, etc.) to the secure element 38. By way of example, the secure channel may be implemented in accordance with the GlobalPlatform Card Specification v2.2, or other suitable secure channel architecture. In accordance with one example embodiment, the TSM server 40 may use a "push" message to initiate the secure element 38 update process, which may advantageously help ensure that the correct device (and thus correct secure element) is being accessed. The TSM server 40 may then advantageously perform all of the necessary changes on the secure element 38. However, other suitable communications approaches between the TSM server 40 and the mobile device 33 may also be used.

The TSM server 40 may thereby cooperate with the verification database server 32 to help ensure that only authorized or verified third party application servers 31 are allowed to obtain access to the secure element 38 on the mobile device 33. Yet, in addition to providing a convenient central repository for information about approved application servers 31, the verification database server 32 also advantageously provides a relatively quick and convenient approach for suspending access by application servers 31 to secure elements 38 under the control of the TSM server 40, at Blocks 55-56. For example, if an application associated with the application server 31 is modified in such a way that it violates applicable network policies or terms of use (e.g., security requirements, resource utilization requirements, etc.), then the TSM server 40 may advantageously suspend the registration of the given application server 31 with the verification database server 32. This advantageously prevents the application server 31 from any further writing of data to or otherwise accessing the secure elements 38 of one or more of the mobile devices 33 serviced by the TSM server 40. Other reasons for suspending an application server 31 may include network security or operational problems, scheduled system maintenance, etc. The suspension may be temporary or permanent, depending upon the given circumstances. In some instances, the registration of the application server 31 may be completely cancelled or revoked.

Thus, suspending or revoking access to the secure element 38 by the application server 31 may be easily accomplished by updating the appropriate database tables of the verification database server 32, for example. Advantageously, no changes to the mobile device 33 are required to restrict access to the secure element 38, which advantageously avoids the need for excess communication between numerous mobile devices 33 and the TSM server 40 whenever a suspension or restriction is necessary. This may also advantageously help expedite the suspension process to quickly deal with potential mobile device or network security breaches.

Figure 4:
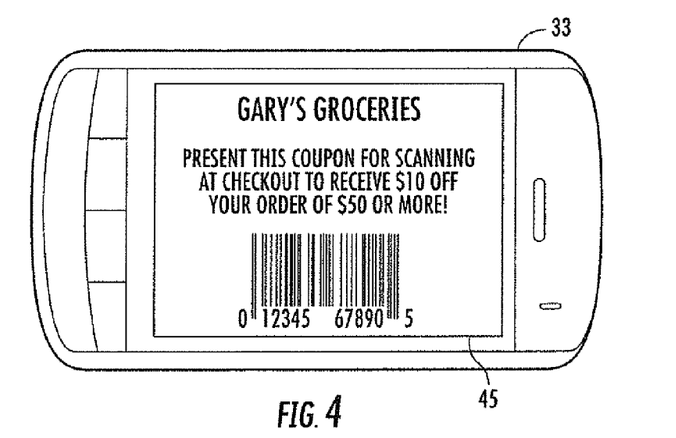
FIG. 4 is a front view of the mobile device of FIG. 3 illustrating a point-of-sale transaction configuration.

Referring additionally to FIG. 4, in some embodiments the verification database server 32 may be used for applications which need not require NFC communication, such as coupons or Internet payments, for example. In the illustrated example, a coupon application is installed on the mobile device 33, and the application server 31 may request access to the memory 37 to provide updated coupons for new offers or sales. More particularly, the mobile device 33 may be registered with the application server 31, so that the application server 31 may distribute coupons or other offers of interest to the mobile device user. Here, a coupon for "Gary's Groceries" has been provided to the mobile device 33 after the above-described verification procedures are performed by the TSM server 40 and the verification database server 32. The coupon has a bar code thereon and may be presented on the display 45 at the time of use, for example, so the bar code may be scanned at a point-of-sale (POS) terminal. In other implementations, the coupon may include a QR code or other suitable indicia, for example. Moreover, in some embodiments the coupon may include information to be communicated via NFC, in addition to or instead of a bar code or QR code.

A similar embodiment for Internet-based payments may allow a user to access a merchant website on the mobile device 33, and access a wallet application to make online payments. As with the above-described coupon embodiment, this approach may also benefit from the enhanced security provided by the verification server database 32. Moreover, in some embodiments the verification database server 32 may advantageously be used with more than one TSM server 40, to thereby provide a central repository or authorized application sources for multiple TSM servers, rather than a single TSM server, as described above.

Example components of a mobile wireless communications device 1000 that may be used in accordance with the above-described embodiments are further described below with reference to FIG. 5. The device 1000 illustratively includes a housing 1200, a keyboard or keypad 1400 and an output device 1600. The output device shown is a display 1600, which may comprise a full graphic LCD. Other types of output devices may alternatively be utilized. A processing device 1800 is contained within the housing 1200 and is coupled between the keypad 1400 and the display 1600. The processing device 1800 controls the operation of the display 1600, as well as the overall operation of the mobile device 1000, in response to actuation of keys on the keypad 1400.

The housing 1200 may be elongated vertically, or may take on other sizes and shapes (including clamshell housing structures). The keypad may include a mode selection key, or other hardware or software for switching between text entry and telephony entry.

Figure 5:
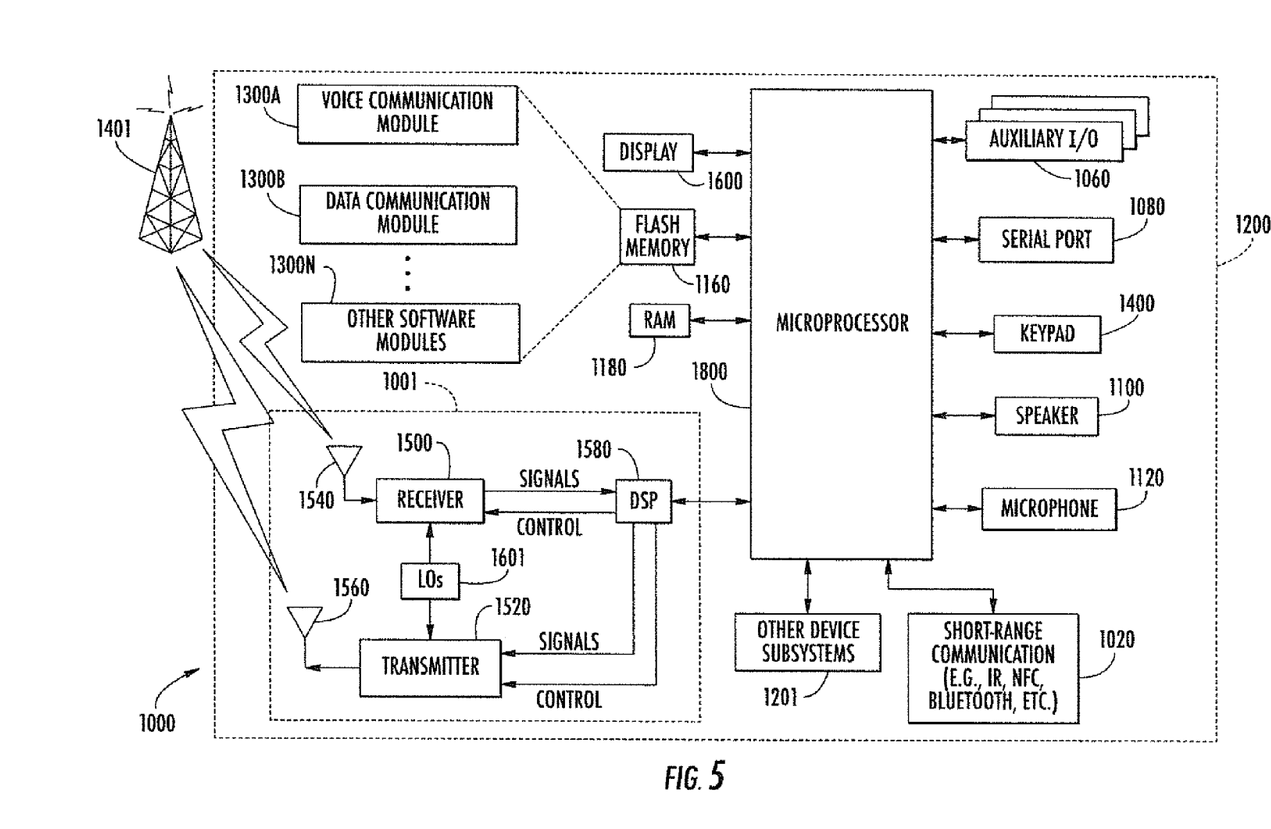
FIG. 5 is a schematic diagram illustrating example components that may be used with the mobile devices of FIG. 1, 3, or 4.

In addition to the processing device 1800, other parts of the mobile device 1000 are shown schematically in FIG. 5. These include a communications subsystem 1001; a short-range communications subsystem 1020; the keypad 1400 and the display 1600, along with other input/output devices 1060, 1080, 1100 and 1120; as well as memory devices 1160, 1180 and various other device subsystems 1201. The mobile device 1000 may comprise a two-way RF communications device having data and, optionally, voice communications capabilities. In addition, the mobile device 1000 may have the capability to communicate with other computer systems via the Internet.

Operating system software executed by the processing device 1800 is stored in a persistent store, such as the flash memory 1160, but may be stored in other types of memory devices, such as a read only memory (ROM) or similar storage element. In addition, system software, specific device applications, or parts thereof, may be temporarily loaded into a volatile store, such as the random access memory (RAM) 1180. Communications signals received by the mobile device may also be stored in the RAM 1180.

The processing device 1800, in addition to its operating system functions, enables execution of software applications 1300A-1300N on the device 1000. A predetermined set of applications that control basic device operations, such as data and voice communications 1300A and 1300B, may be installed on the device 1000 during manufacture. In addition, a personal information manager (PIM) application may be installed during manufacture. The PIM may be capable of organizing and managing data items, such as e-mail, calendar events, voice mails, appointments, and task items. The PIM application may also be capable of sending and receiving data items via a wireless network 1401. The PIM data items may be seamlessly integrated, synchronized and updated via the wireless network 1401 with corresponding data items stored or associated with a host computer system.

Communication functions, including data and voice communications, are performed through the communications subsystem 1001, and possibly through the short-range communications subsystem. The communications subsystem 1001 includes a receiver 1500, a transmitter 1520, and one or more antennas 1540 and 1560. In addition, the communications subsystem 1001 also includes a processing module, such as a digital signal processor (DSP) 1580, and local oscillators (LOs) 1601. The specific design and implementation of the communications subsystem 1001 is dependent upon the communications network in which the mobile device 1000 is intended to operate. For example, a mobile device 1000 may include a communications subsystem 1001 designed to operate with the Mobitex™, Data TAC™ or General Packet Radio Service (GPRS) mobile data communications networks, and also designed to operate with any of a variety of voice communications networks, such as AMPS, TDMA, CDMA, WCDMA, PCS, GSM, EDGE, etc. Other types of data and voice networks, both separate and integrated, may also be utilized with the mobile device 1000. The mobile device 1000 may also be compliant with other communications standards such as 3GSM, 3GPP, UMTS, 4G, etc.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore typically involves use of a subscriber identity module, commonly referred to as a SIM card, in order to operate on a GPRS network.

When required network registration or activation procedures have been completed, the mobile device 1000 may send and receive communications signals over the communication network 1401. Signals received from the communications network 1401 by the antenna 1540 are routed to the receiver 1500, which provides for signal amplification, frequency down conversion, filtering, channel selection, etc., and may also provide analog to digital conversion. Analog-to-digital conversion of the received signal allows the DSP 1580 to perform more complex communications functions, such as demodulation and decoding. In a similar manner, signals to be transmitted to the network 1401 are processed (e.g. modulated and encoded) by the DSP 1580 and are then provided to the transmitter 1520 for digital to analog conversion, frequency up conversion, filtering, amplification and transmission to the communication network 1401 (or networks) via the antenna 1560.

In addition to processing communications signals, the DSP 1580 provides for control of the receiver 1500 and the transmitter 1520. For example, gains applied to communications signals in the receiver 1500 and transmitter 1520 may be adaptively controlled through automatic gain control algorithms implemented in the DSP 1580.

In a data communications mode, a received signal, such as a text message or web page download, is processed by the communications subsystem 1001 and is input to the processing device 1800. The received signal is then further processed by the processing device 1800 for an output to the display 1600, or alternatively to some other auxiliary I/O device 1060. A device may also be used to compose data items, such as e-mail messages, using the keypad 1400 and/or some other auxiliary I/O device 1060, such as a touchpad, a rocker switch, a thumb-wheel, or some other type of input device. The composed data items may then be transmitted over the communications network 1401 via the communications subsystem 1001.

In a voice communications mode, overall operation of the device is substantially similar to the data communications mode, except that received signals are output to a speaker 1100, and signals for transmission are generated by a microphone 1120. Alternative voice or audio I/O subsystems, such as a voice message recording subsystem, may also be implemented on the device 1000. In addition, the display 1600 may also be utilized in voice communications mode, for example to display the identity of a calling party, the duration of a voice call, or other voice call related information.

The short-range communications subsystem enables communication between the mobile device 1000 and other proximate systems or devices, which need not necessarily be similar devices. For example, the short-range communications subsystem may include an infrared device and associated circuits and components, a Bluetooth™ communications module to provide for communication with similarly-enabled systems and devices, or a near field communications (NFC) sensor for communicating with a NFC transceiver or NFC tag via NFC communications, as noted above.

Many modifications and other embodiments will come to the mind of one skilled in the art having the benefit of the teachings presented in the foregoing descriptions and the associated drawings. Therefore, it is understood that various modifications and embodiments are intended to be included within the scope of the appended claims.

That which is claimed is:

1. A trusted service manager (TSM) server comprising:
at least one communications device; and
a processor coupled with the at least one communications device and capable of
registering an application source,
receiving a request from the application source to access a memory of a mobile communications device,
verifying the application source based upon the access request and based upon registering of the application source, and
writing application data from the application source to the memory of the mobile communications device based upon verifying the application source.

2. The TSM server of claim 1 wherein registering of the application source is based upon a service identifier associated with the application source.

3. The TSM server of claim 2 wherein the service identifier comprises a service identification (ID) associated with the application data and an application ID associated with the application source.

4. The TSM server of claim 1 wherein the processor is further capable of suspending the registration of the application source to prevent writing of application data to the memory.

5. The TSM server of claim 1 wherein writing the application data to the memory comprises at least one of installing a new application or updating an existing application.

6. The TSM server of claim 1 wherein the application data comprises at least one of financial transaction application data or physical access application data.

7. The TSM server of claim 1 wherein registering comprises registering the application source with a verification database server; and wherein verifying comprises cooperating with the verification database server to verify the application source.

8. A communications system comprising:
at least one mobile communications device comprising a memory; and
a trusted service manager (TSM) server capable of communicating with the at least one mobile communications device, the TSM server also being capable of
registering an application source,
receiving a request from the application source to access the memory of the mobile communications device,
verifying the application source based upon the access request and based upon registering of the application source, and
writing application data from the application source to the memory of the at least one mobile communications device based upon verifying the application source.

9. The communications system of claim 8 wherein registering of the application source is based upon a service identifier associated with the application source.

10. The communications system of claim 9 wherein the service identifier comprises a service identification (ID) associated with the application data and an application ID associated with the application source.

11. The communications system of claim 8 wherein the TSM server is further capable of suspending the registration of the application source to prevent writing of application data from the application source to the memory.

12. The communications system of claim 8 wherein the memory comprises a secure element.

13. The communications system of claim 8 wherein the at least one mobile communications device further comprises an NFC transceiver; and wherein the application data is capable of causing the NFC transceiver to communicate via NFC.

14. The communications system of claim 8 wherein writing the application data from the application source to the memory comprises at least one of installing a new application or updating an existing application.

15. The communications system of claim 8 wherein the application data comprises at least one of financial transaction application data or physical access application data.

16. The communications system of claim 8 further comprising a verification database server; wherein registering comprises registering the application source with the verification database server; and wherein verifying comprises cooperating with the verification database server to verify the application source.

17. The communications system of claim 16 wherein the verification database server comprises a Web service database.

18. A communications method comprising:
registering an application source at a trusted service manager (TSM) server;
at the TSM server, receiving a request from the application source to access a memory of a mobile communications device;
verifying the application source based upon the access request and based upon registering of the application source; and
writing application data from the application source to the memory of the at least one mobile communications device via the TSM server based upon verifying the application source.

19. The method of claim 18 wherein registering of the application source is based upon a service identifier associated with the application source.

20. The method of claim 19 wherein the service identifier comprises a service identification (ID) associated with the application data and an application ID associated with the application source.

21. The method of claim 18 further comprising suspending the registration of the application source by the TSM server to prevent writing of application data from the application source to the memory.

22. The method of claim 18 wherein writing the application data from the application source to the memory comprises at least one of installing a new application or updating an existing application.

23. A non-transitory computer-readable medium having computer-executable instructions for causing a trusted service manager (TSM) server to perform steps comprising:
registering an application source;
receiving a request from the application source to access a memory of a mobile communications device;
verifying the application source based upon the access request and based upon registering of the application source; and
writing application data from the application source to the memory of the at least one mobile communications device based upon verifying the application source.

24. The non-transitory computer-readable medium of claim 23 wherein registering of the application source is based upon a service identifier associated with the application source.

25. The non-transitory computer-readable medium of claim 24 wherein the service identifier comprises a service identification (ID) associated with the application data and an application ID associated with the application source.

26. The non-transitory computer-readable medium of claim 23 further having computer-executable instructions for causing the TSM server to suspend the registration of the application source to prevent writing of application data from the application source to the memory.

* * * * *